(12) United States Patent
Kalhous et al.

(10) Patent No.: US 9,043,042 B2
(45) Date of Patent: May 26, 2015

(54) METHOD TO MAP GAZE POSITION TO INFORMATION DISPLAY IN VEHICLE

(75) Inventors: Amanda J. Kalhous, Ajax (CA); Fuad Al-Amin, Toronto (CA); Jarvis Chau, Toronto (CA); Norman J. Weigert, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 336 days.

(21) Appl. No.: 13/185,545

(22) Filed: Jul. 19, 2011

(65) Prior Publication Data

US 2013/0024047 A1 Jan. 24, 2013

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| G06F 3/01 | (2006.01) |

(52) U.S. Cl.
CPC ...................................... G06F 3/013 (2013.01)

(58) Field of Classification Search
USPC ............................................................. 701/1
See application file for complete search history.

(56) References Cited

U.S. PATENT DOCUMENTS

| | | | | | |
|---|---|---|---|---|---|
| 4,625,329 | A * | 11/1986 | Ishikawa et al. | ............... | 382/104 |
| 5,008,946 | A * | 4/1991 | Ando | ............... | 382/104 |
| 5,598,145 | A * | 1/1997 | Shimotani et al. | ............... | 340/576 |
| 5,734,357 | A * | 3/1998 | Matsumoto | ............... | 345/7 |
| 6,198,998 | B1 * | 3/2001 | Farmer et al. | ............... | 701/45 |
| 6,272,431 | B1 * | 8/2001 | Zamojdo et al. | ............... | 701/454 |
| 6,327,522 | B1 * | 12/2001 | Kojima et al. | ............... | 701/1 |
| 6,348,877 | B1 * | 2/2002 | Berstis et al. | ............... | 340/980 |
| 6,578,869 | B2 * | 6/2003 | Zayan et al. | ............... | 280/735 |
| 6,580,973 | B2 * | 6/2003 | Leivian et al. | ............... | 701/1 |
| 6,789,044 | B2 * | 9/2004 | Claussen | ............... | 702/152 |
| 6,859,144 | B2 * | 2/2005 | Newman et al. | ............... | 340/576 |
| 7,027,621 | B1 * | 4/2006 | Prokoski | ............... | 382/118 |
| 7,180,476 | B1 * | 2/2007 | Guell et al. | ............... | 345/7 |
| 7,231,060 | B2 * | 6/2007 | Dowling et al. | ............... | 382/100 |
| 7,386,372 | B2 * | 6/2008 | Breed et al. | ............... | 701/1 |
| 7,460,940 | B2 * | 12/2008 | Larsson et al. | ............... | 701/49 |
| 7,519,459 | B2 * | 4/2009 | Ito et al. | ............... | 701/36 |
| 7,639,149 | B2 * | 12/2009 | Katoh | ............... | 340/576 |
| 7,792,328 | B2 * | 9/2010 | Albertson et al. | ............... | 382/104 |
| 7,810,050 | B2 * | 10/2010 | Hirai et al. | ............... | 715/863 |
| 7,970,175 | B2 * | 6/2011 | Malawey et al. | ............... | 382/103 |
| 8,009,025 | B2 * | 8/2011 | Engstrom et al. | ............... | 340/438 |
| 8,055,023 | B2 * | 11/2011 | Goto et al. | ............... | 382/104 |
| 8,063,952 | B2 * | 11/2011 | Kamada et al. | ............... | 348/231.9 |
| 8,144,002 | B2 * | 3/2012 | Kiuchi | ............... | 340/435 |
| 8,350,686 | B2 * | 1/2013 | Inoue | ............... | 340/436 |
| 8,376,595 | B2 * | 2/2013 | Higgins-Luthman | ............... | 362/466 |
| 8,379,918 | B2 * | 2/2013 | Pfleger et al. | ............... | 382/103 |
| 8,391,554 | B2 * | 3/2013 | Lee et al. | ............... | 382/104 |
| 8,400,313 | B2 * | 3/2013 | Noguchi et al. | ............... | 340/576 |
| 2002/0055808 | A1 * | 5/2002 | Matsumoto | ............... | 701/1 |
| 2002/0135165 | A1 * | 9/2002 | Zayan et al. | ............... | 280/735 |
| 2004/0153229 | A1 * | 8/2004 | Gokturk et al. | ............... | 701/45 |
| 2006/0011399 | A1 * | 1/2006 | Brockway et al. | ............... | 180/272 |
| 2006/0079729 | A1 * | 4/2006 | Kim | ............... | 600/21 |

(Continued)

*Primary Examiner* — Nicholas Kiswanto

(74) *Attorney, Agent, or Firm* — Cantor Colburn LLP

(57) ABSTRACT

A method of controlling a vehicle system of a vehicle is provided. The method includes: receiving image data that is captured from an occupant of the vehicle; determining a focus of the occupant of the vehicle based on the image data; and generating a user command to control the vehicle system based on the focus of the occupant.

17 Claims, 3 Drawing Sheets

(56) References Cited

U.S. PATENT DOCUMENTS

| | | | |
|---|---|---|---|
| 2006/0149426 A1* | 7/2006 | Unkrich et al. | 701/1 |
| 2006/0202843 A1* | 9/2006 | Ota | 340/576 |
| 2007/0156317 A1* | 7/2007 | Breed | 701/45 |
| 2007/0193811 A1* | 8/2007 | Breed et al. | 180/271 |
| 2008/0230297 A1* | 9/2008 | Lee et al. | 180/271 |
| 2008/0236929 A1* | 10/2008 | Fukaya et al. | 180/272 |
| 2009/0086165 A1* | 4/2009 | Beymer | 351/210 |
| 2009/0090577 A1* | 4/2009 | Takahashi et al. | 180/272 |
| 2009/0097705 A1* | 4/2009 | Thorn | 382/103 |
| 2009/0231145 A1* | 9/2009 | Wada et al. | 340/575 |
| 2010/0079413 A1* | 4/2010 | Kawashima et al. | 345/175 |
| 2010/0123781 A1* | 5/2010 | Shimura | 348/164 |
| 2010/0288573 A1* | 11/2010 | Nishina | 180/272 |
| 2011/0029185 A1* | 2/2011 | Aoki et al. | 701/29 |
| 2012/0212353 A1* | 8/2012 | Fung et al. | 340/905 |
| 2013/0006525 A1* | 1/2013 | Stroila | 701/434 |

\* cited by examiner

METHOD TO MAP GAZE POSITION TO INFORMATION DISPLAY IN VEHICLE

FIELD OF THE INVENTION

The subject disclosure relates to methods, systems, and computer program products for using driver gaze to control vehicle systems.

BACKGROUND

The main controls for vehicle entertainment systems are typically located in the center of the vehicle dashboard. In order to manipulate the entertainment system to perform some function, a driver temporarily changes their focus of attention from the road to the entertainment system.

Accordingly, it is desirable to provide systems and methods for manipulating vehicle functions without changing the focus of the driver.

SUMMARY OF THE INVENTION

In one exemplary embodiment, a method of controlling a vehicle system of a vehicle is provided. The method includes: receiving image data that is captured from an occupant of the vehicle; determining a focus of the occupant of the vehicle based on the image data; and generating a user command to control the vehicle system based on the focus of the occupant.

In another exemplary embodiment, a control system for a vehicle is provided. The control system includes a first module that determines a focus of an occupant of the vehicle based on image data, where the image data is captured from the occupant using an image processor. A second module generates a user command to control a vehicle system based on the focus of the occupant.

In yet another exemplary embodiment, a vehicle is provided. The vehicle includes an image processor that captures image data of an occupant of the vehicle. A human machine interface module processes the image data and generates a user command based on the image data. A vehicle system receives the user command and controls a function of the vehicle system based on the user command.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
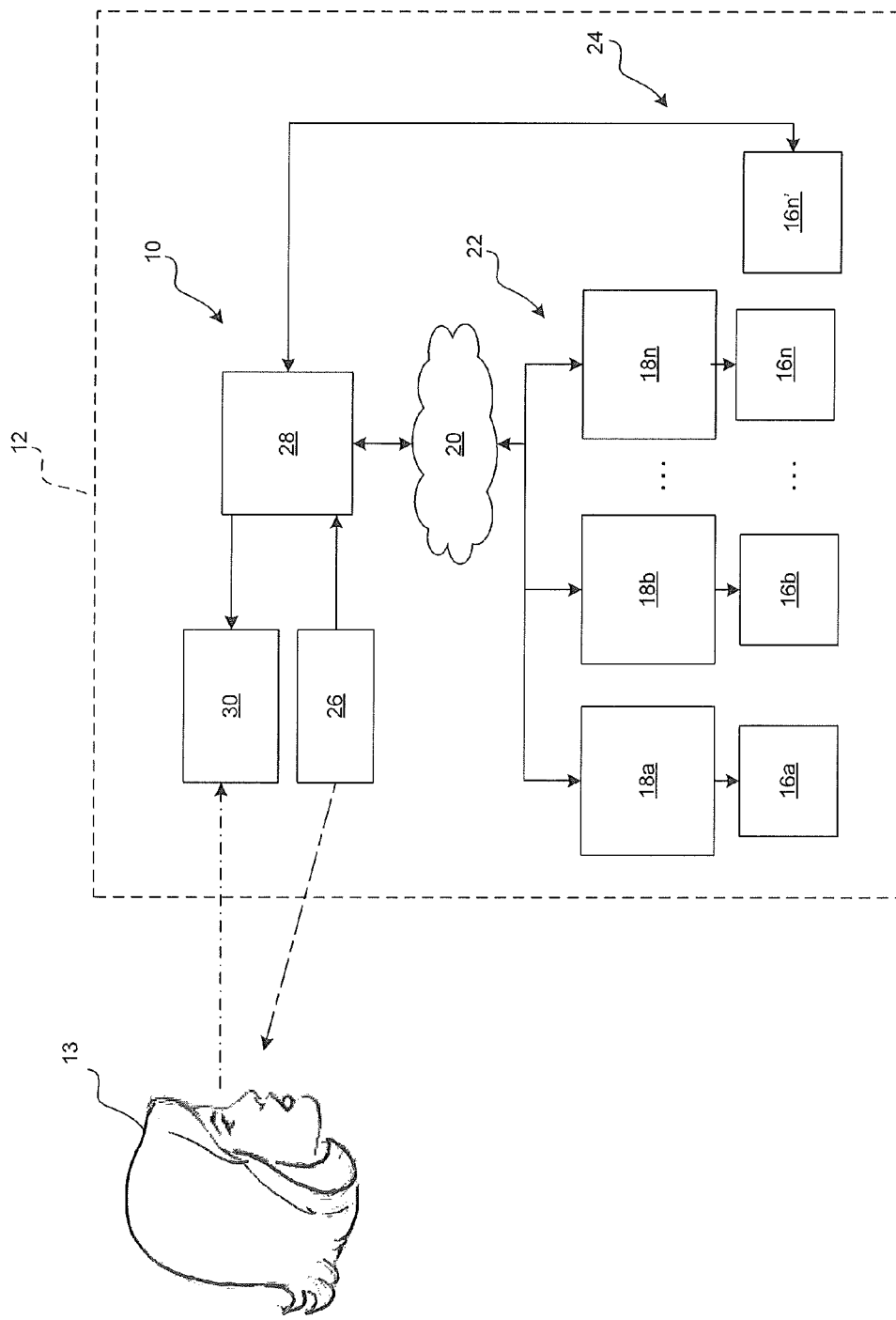
FIG. 1 is a functional block diagram illustrating a vehicle that includes a driver gaze control system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In accordance with exemplary embodiments, a gaze based control system shown generally at 10 is shown to be included within a vehicle 12. The gaze based control system 10 processes retinal information of a driver 13 or other occupant of the vehicle 12 and generates control signals for controlling functions of vehicle systems 16a-16n based thereon. Such vehicle systems 16a-16n may include, for example, but are not limited to, an entertainment system, a navigation system, a telematics system, and/or any other system within the vehicle. As can be appreciated, the control signals can be transmitted to control modules 18a-18n associated with the vehicle systems 16a-16n through a vehicle network 20 (as shown generally at 22) and/or can be transmitted directly to the vehicle system 16n' (as shown generally at 24).

In various embodiments, the gaze based control system 10 includes an image processor 26 that captures image data of the driver 13 and a human machine interface (HMI) module 28 that processes the captured image data. Based on the processed image data, the HMI module 28 generates the control signals to control one or more of the vehicle systems 16a-16n.

In various embodiments, the HMI module communicates with a display system 30. The display system 30 displays a user interface that corresponds to the vehicle system 16a-16n to be controlled. In various embodiments, the user interface is displayed in or near the line of vision of the driver 13. For example, the user interface can be displayed on a windshield (not shown) of the vehicle 12 by a heads up display (HUD) system. The HMI module 28 processes the image data relative to the displayed user interface.

Figure 2:
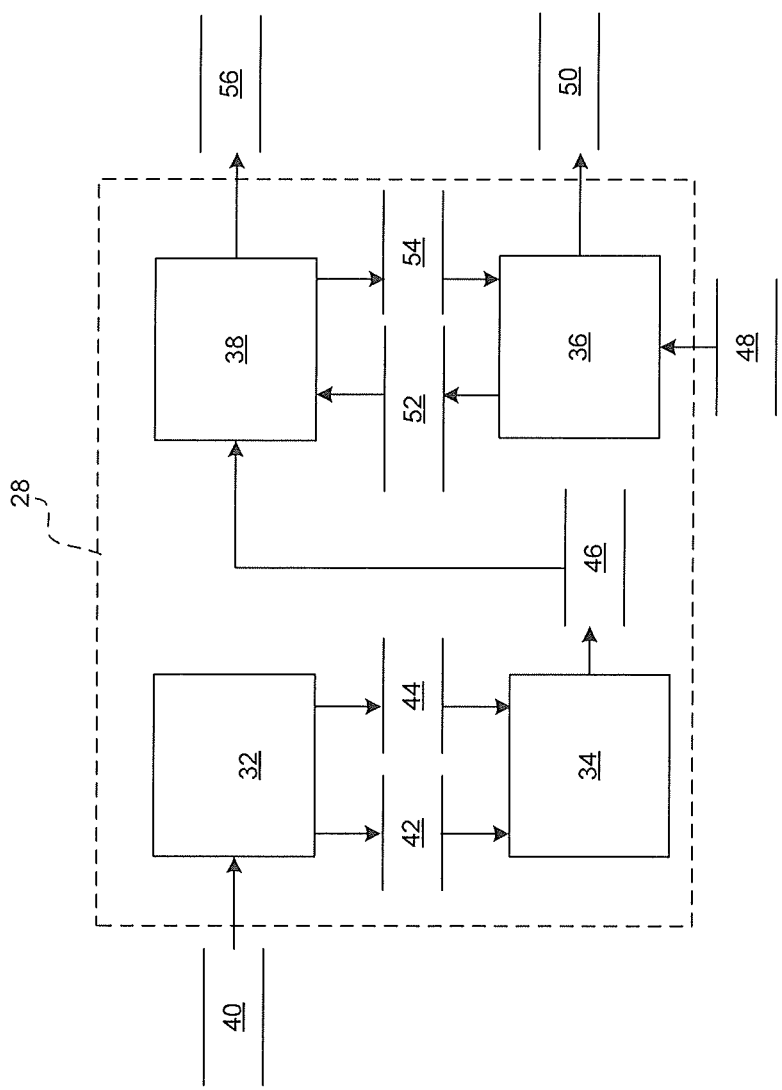
FIG. 2 is a dataflow diagram illustrating a driver gaze control module in accordance with exemplary embodiments.

Referring now to FIG. 2, dataflow diagrams illustrate the HMI module 28 in accordance with various embodiments. As can be appreciated, various embodiments of HMI modules 28, according to the present disclosure, may include any number of sub-modules. The sub-modules shown in FIG. 2 may be combined and/or further partitioned to similarly recognize a driver's gaze and to control functions of one or more vehicle systems 16a-16n' (FIG. 1) based thereon. Inputs to the HMI module 28 may be received from one or more sensory inputs of the vehicle 12 (FIG. 1), received from other modules (not shown) within the vehicle 12 (FIG. 1), determined/modeled by other modules (not shown) within the HMI module 28, and/or received from an external source over a network (e.g., the Internet). In the example of FIG. 2, the HMI module 28 includes an image processing module 32, a gaze analysis module 34, a display module 36, and a command module 38.

The image processing module 32 receives as input image data 40. The image processing module 32 processes the image data 40 to distinguish a face and eyes of the driver 13 (FIG. 1) and generates eye data 42 and face data 44 based thereon. As can be appreciated, various analysis methods can be performed by the image processing module 32 to distinguish the eyes and the face from the image data 40. Such analysis methods can include, but are not limited to use of infrared illumination on the eye to generate a bright pupil effect that creates a high contrast between the pupils and the rest of the face to provide eye tracking robustness and accuracy. Facial detection is performed using the Viola-Jones object detection framework.

The gaze analysis module 34 receives as input the eye data 42 and the face data 44. The gaze analysis module 34 determines a focus of the driver 13 (FIG. 1) based on the eye data 42 and/or the face data 44 and generates focus data 46 based thereon. As can be appreciated, various analysis methods can be performed by the gaze analysis module 34 to determine the focus of the driver 13 (FIG. 1). Such analysis methods can include, but are not limited to using the self-calibrated resting state data of the driver from the gaze analysis module and determining the relative eye (pupil) and face position, the driver focusing algorithm is able to determine the focus of the driver.

In various embodiments, the gaze analysis module 34 can analyze the face data 44 using an analysis method to determine a position of the face. The gaze analysis module 34 can then analyze the eye data 42 using an analysis method and based on the face position to determine a focus of the eye(s). In various embodiments, the focus of the eye(s) can be represented by, for example, a general location, or an x, y coordinate within a two-dimensional plane.

The display module 36 receives as input system data 48. The system data 48 can be generated by the vehicle system 16a-16n (FIG. 1) to be controlled and can indicate a current state of the vehicle system 16a-16n (FIG. 1). Based on the system data 48, the display module 36 manages the user interface to be displayed via display data 50. For example, the display module 36 can generate display data 50 that can be used by the display system 30 to display a particular screen or notification of the user interface associated with the vehicle system 16a-16n (FIG. 1) to be controlled.

The display module 36 then makes available that display data or other display/function data 52 to the command module 38. The display/function data 52 indicates any functions associated with the particular screen or notification that is being displayed and a mapping of the functions to the two-dimensional plane on which the user interface is displayed. For example, function x, y, and z are provided by the screen being displayed. Function x is mapped to the coordinates ((a, b), (c, d), (e, f), etc.) of the user interface; function y is mapped to the coordinates ((g, h), (i, j), (k, l), etc.) of the user interface; and function z is mapped to the coordinates ((m, n), (o, p), (q, r), etc.) of the user interface.

In various embodiments, the display module 36 further receives as input a selection 54. As will be discussed in more detail with regard to the command module 38, the selection 54 can be generated when the function selected is associated with a new screen or notification of the user interface. Based on the selection 54, the display module 36 can modify the display data 50 (e.g., to display a new screen or notification) and the display/function data 52.

The command module 38 receives as input the display/function data 52 and the focus data 46. Based on the inputs 46, 52, the command module 38 determines the selection 54 of the driver and, in some cases, generates a user command 56 based thereon. For example, the command module 38 maps the coordinates of the focus data 46 to coordinates of display/function data 52 and determines the function associated with the coordinates. The command module 38 then determines the appropriate command for that function and generates a user command 56 based thereon.

The user command 56 can be received by the vehicle system 16a-16n' to control a system feature. The user command can be provided back to the display module to initiate the change in the user interface.

Figure 3:
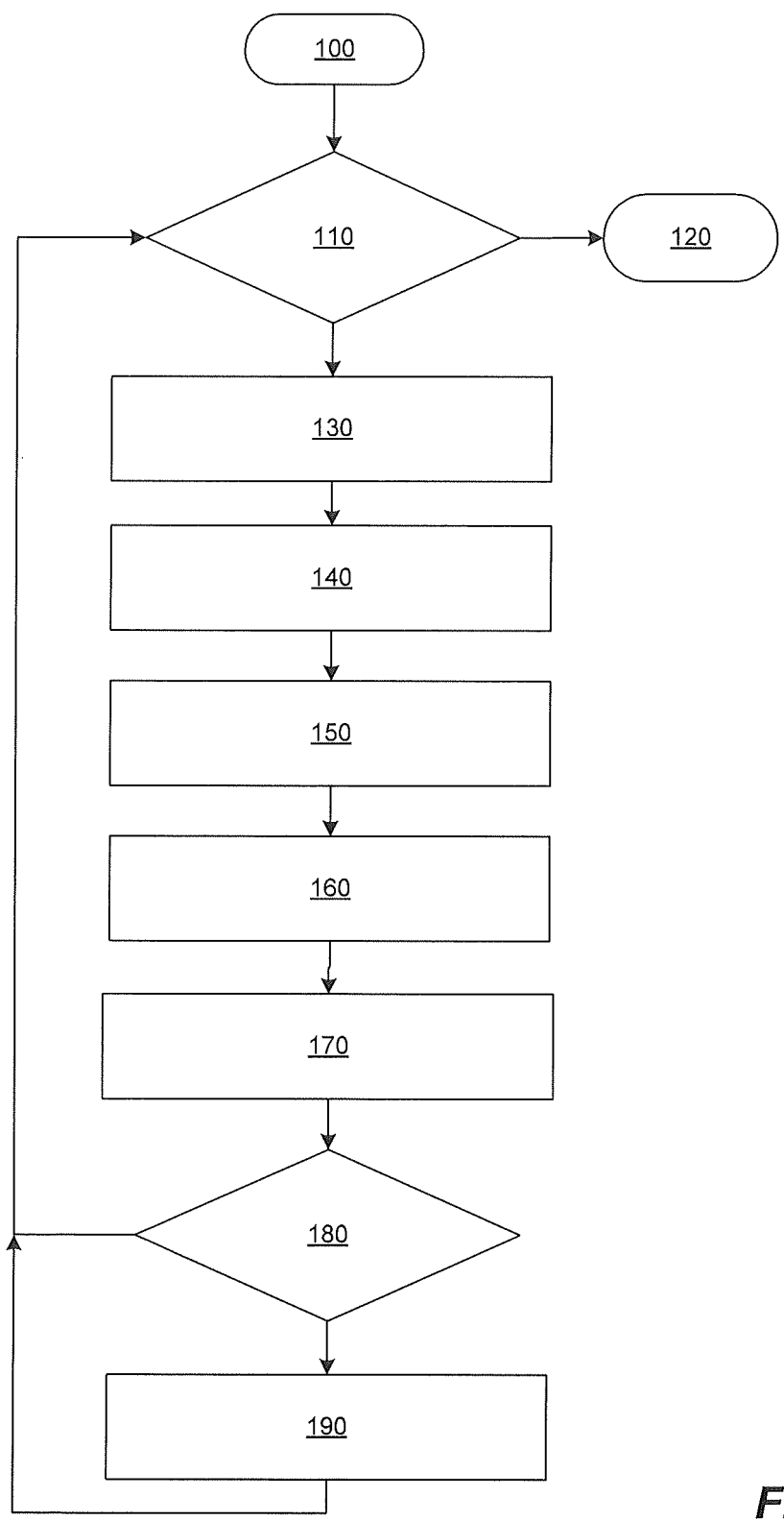
FIG. 3 is a flowchart illustrating a driver gaze control method in accordance with exemplary embodiments.

Referring now to FIG. 3, and with continued reference to FIG. 2, a flowchart illustrates gaze based control methods that can be performed by the gaze based control systems in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. As can further be appreciated, one or more steps may be added or removed without altering the spirit of the method.

In various embodiments, the method can be scheduled to run based on predetermined events, and/or may run continually during operation of the vehicle 12 (FIG. 1) (as shown).

In one example, the method may begin at 100. It is determined whether gaze based control is active at 110 (e.g., a switch is selected by the driver to activate the gaze based control system). If the gaze based control is active at 110, the user interface is determined at 130 based on control system data and any selection. The display data is generated based on the system data and any command data to display the user interface, for example, via the HUD at 140. The image data from the image processor is analyzed at 150 to determine the eye data and/or face data. The eye data and/or the face data is analyzed at 160 to determine the focus. The selection is determined based on the focus and the functions associated with the current user interface being displayed (as indicated by the display/function data) at 170. Optionally, the selection can be confirmed via a prompt from the user interface at 180. If the selection is confirmed at 180, the user command is generated based on the selection and the function associated with the selection at 190. Thereafter, the method continues with monitoring whether the gaze based control system is active at 110. If, however, the gaze based control system is not active, or the gaze based control system becomes not active (e.g., is then switched off), the method may end at 120.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A method of controlling a vehicle system of a vehicle, comprising:

receiving, by a computer processor, image data that is captured from an occupant of the vehicle;

determining a focus of the occupant with respect to one of a plurality of vehicle systems of the vehicle, the focus determined from the image data;

visually representing, via a two-dimensional coordinate system, control options corresponding to the one of the plurality of vehicle systems subject to the focus;

mapping functions corresponding to the control options to the two-dimensional coordinate system and a user interface, the functions configured to control operation of the vehicle system subject to the focus through a corresponding vehicle control module that is communicatively coupled to the computer processor over a vehicle network of the vehicle, the vehicle system integrally embedded in the vehicle;

displaying the user interface including the function mapped to the two-dimensional coordinate system via a display device that is integrally embedded in the vehicle, the display device communicatively coupled to the computer processor;

determining a selection of one of the functions by the occupant based on coordinates associated with the focus information; and generating, via the computer processor, a user command to perform the one of the functions with respect to the vehicle system.

2. The method of claim 1, further comprising analyzing the image data to determine at least one of eye data and face data from the image data.

3. The method of claim 2, wherein determining the focus of the occupant is based on the at least one of eye data and face data.

4. The method of claim 1, further comprising generating display data for displaying the user interface associated with the vehicle system.

5. The method of claim 4, further comprising modifying the display data based on the selected one of the functions, and displaying modified display data on the display device.

6. A control system for a vehicle, comprising:
a computer processor;
logic executable by the computer processor, the logic configured to:
determine a focus of an occupant with respect to one of a plurality of vehicle systems of the vehicle, the focus determined from image data captured from the occupant using an image processor;
visually represent, via a two-dimensional coordinate system, control options corresponding to the one of the plurality of vehicle systems subject to the focus;
map a-functions corresponding to the control options to the two-dimensional coordinate system and a user interface, the functions configured to control operation of a vehicle system subject to the focus through a corresponding vehicle control module that is communicatively coupled to the computer processor and the vehicle system over a vehicle network of the vehicle, the vehicle system integrally embedded in the vehicle;
display the user interface including the function mapped to the two-dimensional coordinate system via a display device that is integrally embedded in the vehicle, the display device communicatively coupled to the computer processor;
determine a selection of one of the functions by the occupant based on coordinates associated with the focus information; and
generate a user command to perform the one of the functions with respect to the vehicle system.

7. The system of claim 6, wherein the logic is further configured to analyze the image data to determine at least one of eye data and face data from the image data.

8. The system of claim 7, wherein the logic is configured to determine the focus of the occupant based on the at least one of eye data and face data.

9. The system of claim 6, wherein the logic is configured to generate display data for displaying the user interface associated with the vehicle system.

10. The system of claim 6, wherein the logic is configured to modify the display data based on the selected one of the functions, and display modified display data on the display device.

11. The system of claim 6, further comprising the image processor that captures the image data of the occupant.

12. A vehicle, comprising:
an image processor implemented by a computer processor that captures image data of an occupant of the vehicle and determines a focus of the occupant with respect to one of a plurality of vehicle systems of the vehicle from the image data, the computer processor further configured to:
visually represent, via a two-dimensional coordinate system, control options corresponding to the one of the plurality of vehicle systems subject to the focus; and
map a-functions corresponding to the control options to the two-dimensional coordinate system and a user interface, the functions configured to control operation of a vehicle system subject to the focus through a corresponding vehicle control module that is communicatively coupled to the computer process and the vehicle system over a vehicle network of the vehicle; and
display the user interface including the function mapped to the two-dimension coordinate system via a display device that is integrally embedded in the vehicle, the display device communicatively coupled to the computer processor; and
a human machine interface module implemented by the computer processor that processes the image data, determines a selection of one of the functions by the occupant based on coordinates associated with the focus information and generates a user command to perform the one of the functions with respect to the vehicle system;
wherein the vehicle system is implemented by the computer processor and receives the user command that controls the functions of the vehicle system based on the user command.

13. The vehicle of claim 12 wherein the display system displays the user interface in a line of sight of the occupant.

14. The vehicle of claim 13 wherein the human machine interface module processes the image data relative to the user interface.

15. The vehicle of claim 13 wherein the human machine interface module transmits interface data to the display system based on the user command.

16. The method of claim 1, wherein the functions are configured to control operation of an entertainment system of the vehicle.

17. The vehicle of claim 13, wherein the display system includes a heads up display, and the heads up display presents the user interface on a front windshield of the vehicle.

* * * * *